(12) United States Patent
Romero

(10) Patent No.: US 6,854,920 B2
(45) Date of Patent: Feb. 15, 2005

(54) TWO PIECE HUB AND HANDLE ASSEMBLY

(75) Inventor: Oscar Romero, Granada Hills, CA (US)

(73) Assignee: Newfrey LLC, Newark, DE (US)

( * ) Notice: Subject to any disclaimer, the term of this patent is extended or adjusted under 35 U.S.C. 154(b) by 340 days.

(21) Appl. No.: 09/732,641

(22) Filed: Dec. 8, 2000

(65) Prior Publication Data

US 2002/0071714 A1 Jun. 13, 2002

(51) Int. Cl.$^7$ ................................................ B25G 3/00
(52) U.S. Cl. ................................. 403/329; 16/441
(58) Field of Search ........................ 16/441; 403/329, 403/328, 327

(56) References Cited

U.S. PATENT DOCUMENTS

| | | | |
|---|---|---|---|
| 2,878,489 A | | 3/1959 | Graham |
| 4,052,768 A | * | 10/1977 | Yamazaki et al. ......... 16/441 X |
| 4,404,866 A | * | 9/1983 | Koike et al. .............. 16/441 X |
| 4,662,389 A | | 5/1987 | Igbal |
| 4,923,325 A | | 5/1990 | Howie, Jr. |
| 4,967,445 A | * | 11/1990 | Miller et al. .............. 16/441 X |
| 5,257,645 A | | 11/1993 | Scully et al. |
| 5,715,868 A | | 2/1998 | Ching et al. |
| 5,797,151 A | | 8/1998 | Ko |
| 5,852,848 A | | 12/1998 | Spurgeon |
| 5,873,387 A | | 2/1999 | Weber et al. |
| 5,893,298 A | | 4/1999 | Keister |
| 5,947,149 A | * | 9/1999 | Mark ......................... 137/359 |
| 5,979,489 A | | 11/1999 | Pitsch |

* cited by examiner

Primary Examiner—Lynne H. Browne
Assistant Examiner—John R. Cottingham
(74) Attorney, Agent, or Firm—Richard J. Veltman; John D. Del Ponti

(57) ABSTRACT

A two piece hub and handle assembly comprises a handle having a plurality of flexible fingers and a hub having a bearing surface for engaging the flexible fingers. A lug formed on each flexible finger engages the bearing surface of the hub to limit axial movement of the handle relative to the hub. The handle includes a grip portion and a tubular portion depending from the grip portion, and the tubular portion includes the plurality of flexible fingers. The tubular portion further includes a plurality of splines for engaging a valve. The hub includes a central aperture with internal threads for engaging an end body, with the valve being disposed in the end body.

4 Claims, 4 Drawing Sheets

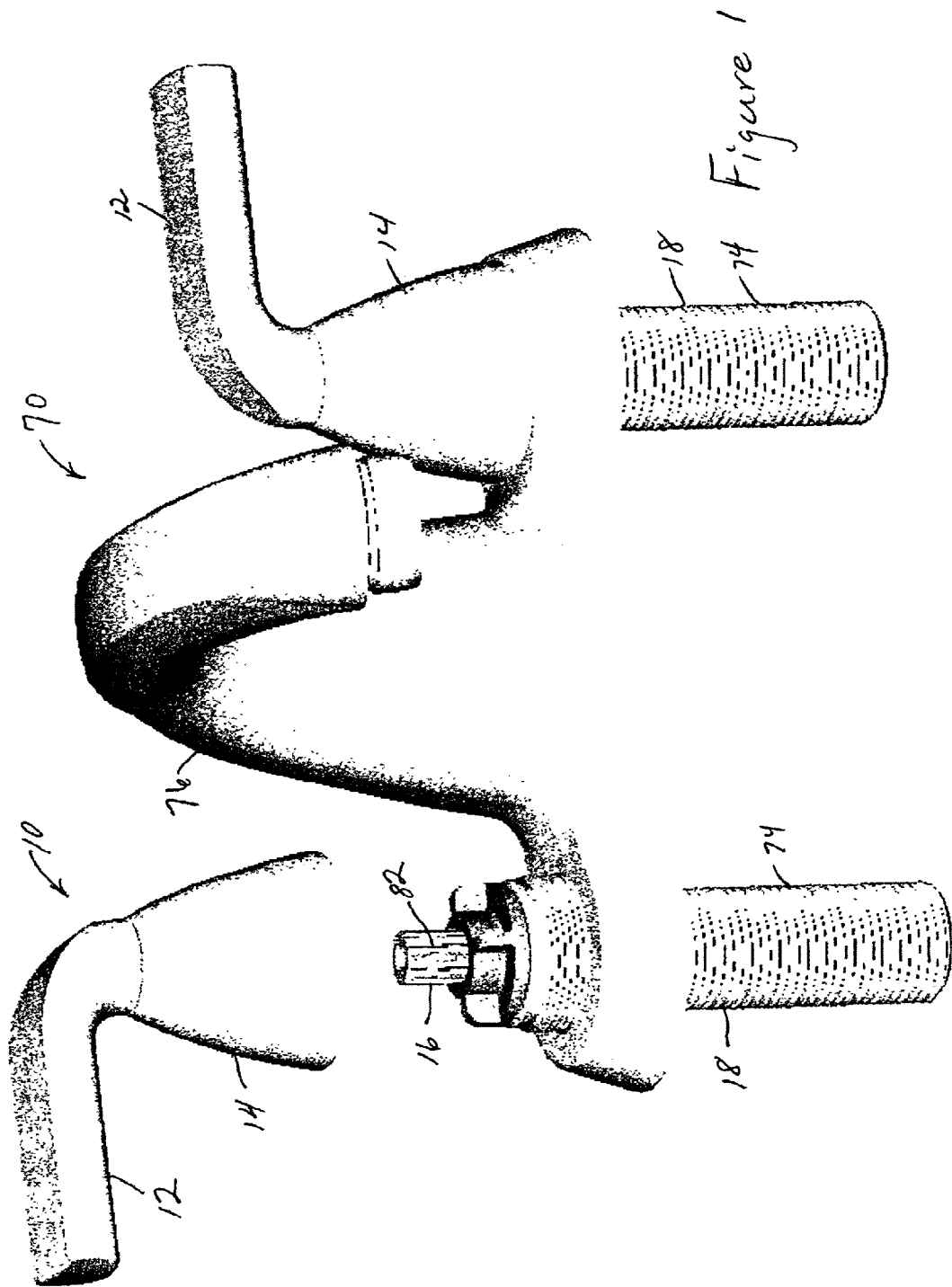

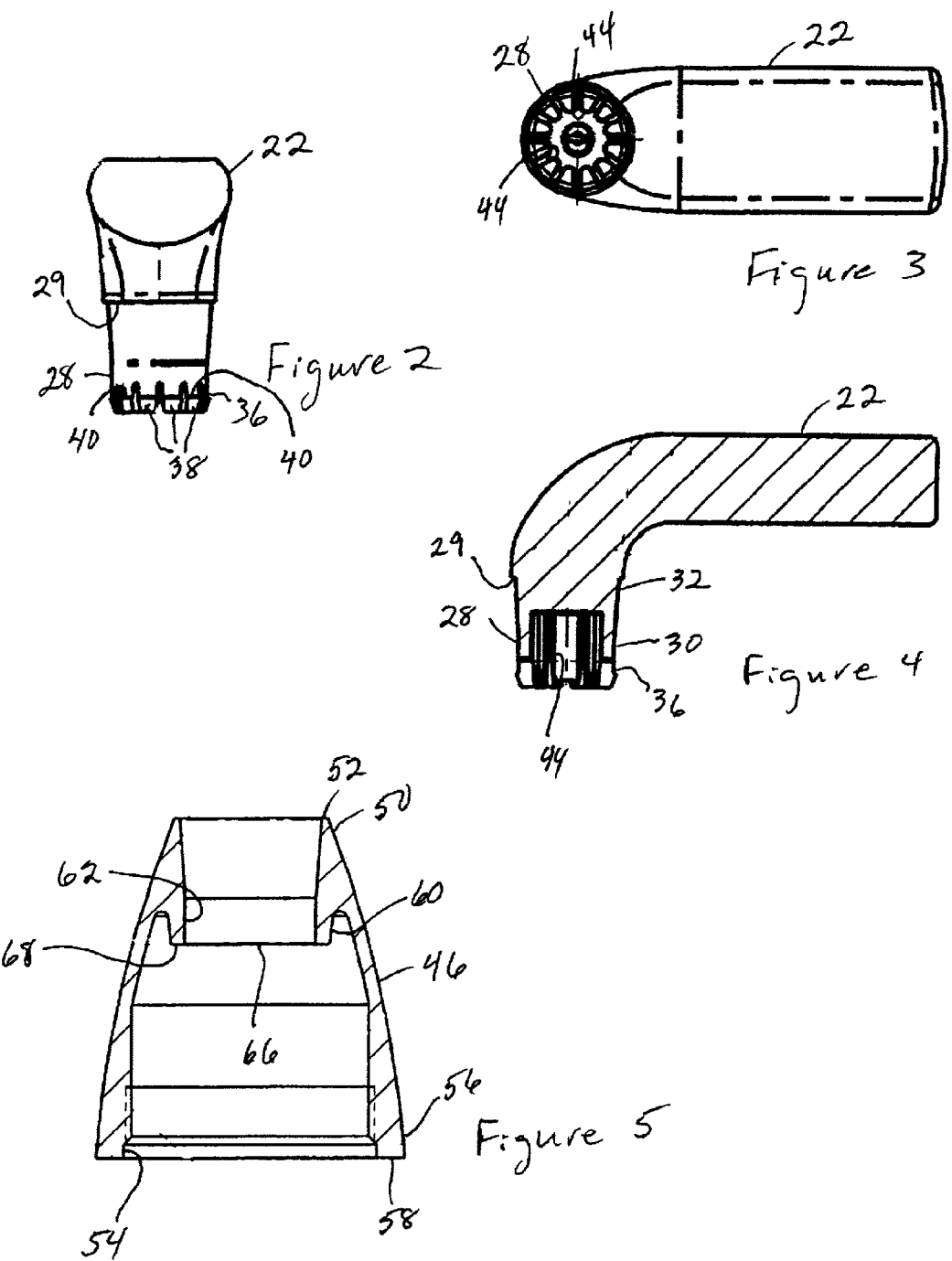

TWO PIECE HUB AND HANDLE ASSEMBLY

BACKGROUND AND SUMMARY OF THE INVENTION

Hub and handle assemblies are used with valves to control the amount of water discharged from a faucet. Hub and handle assemblies typically include at least an escutcheon to provide a finished appearance to the faucet installation, a handle, and a fastener to attach the handle to the valve. Other configurations have even more parts. Unfortunately, more parts translates directly into higher inventory cost and labor cost for assembly.

The present invention overcomes this disadvantageous and others by providing a two piece hub and handle. According to the present invention, a two piece hub and handle assembly comprises a handle having a plurality of flexible fingers and a hub having a bearing surface for engaging the flexible fingers. Each flexible finger includes a lug and the hub includes a lug-engaging surface. The handle includes a grip portion and a tubular portion depending from the grip portion, and the tubular portion includes the plurality of flexible fingers.

According to one aspect of the invention, the handle includes a first bearing surface and the hub includes a second bearing surface, with the first bearing surface abutting the second bearing surface to limit axial movement of the handle relative to the hub. The handle includes a plurality of lugs and the hub includes a third bearing surface, the plurality of lugs engaging the third bearing surface to limit axial movement of the handle relative to the hub.

The handle further includes a plurality of splines for engaging a valve and the hub includes means for engaging an end body. When the splines are fully engaged with the valve, the hub is fully engaged with the end body.

Other features and advantages of the invention will become apparent from the following portion of this specification and from the accompanying drawings that illustrate a presently preferred embodiment incorporating the principles of the invention.

BRIEF DESCRIPTION OF THE DRAWINGS

FIG. 1 is a perspective view of a faucet with a two piece hub and handle assembly in position to be installed on the faucet.

FIG. 2 is an end view of a handle according to the invention.

FIG. 3 is a bottom view of the handle of FIG. 2.

FIG. 4 is a section view taken through the handle of FIG. 2.

FIG. 5 is a section view taken through a hub according to the invention.

DETAILED DESCRIPTION OF THE DRAWINGS

Figure 6:
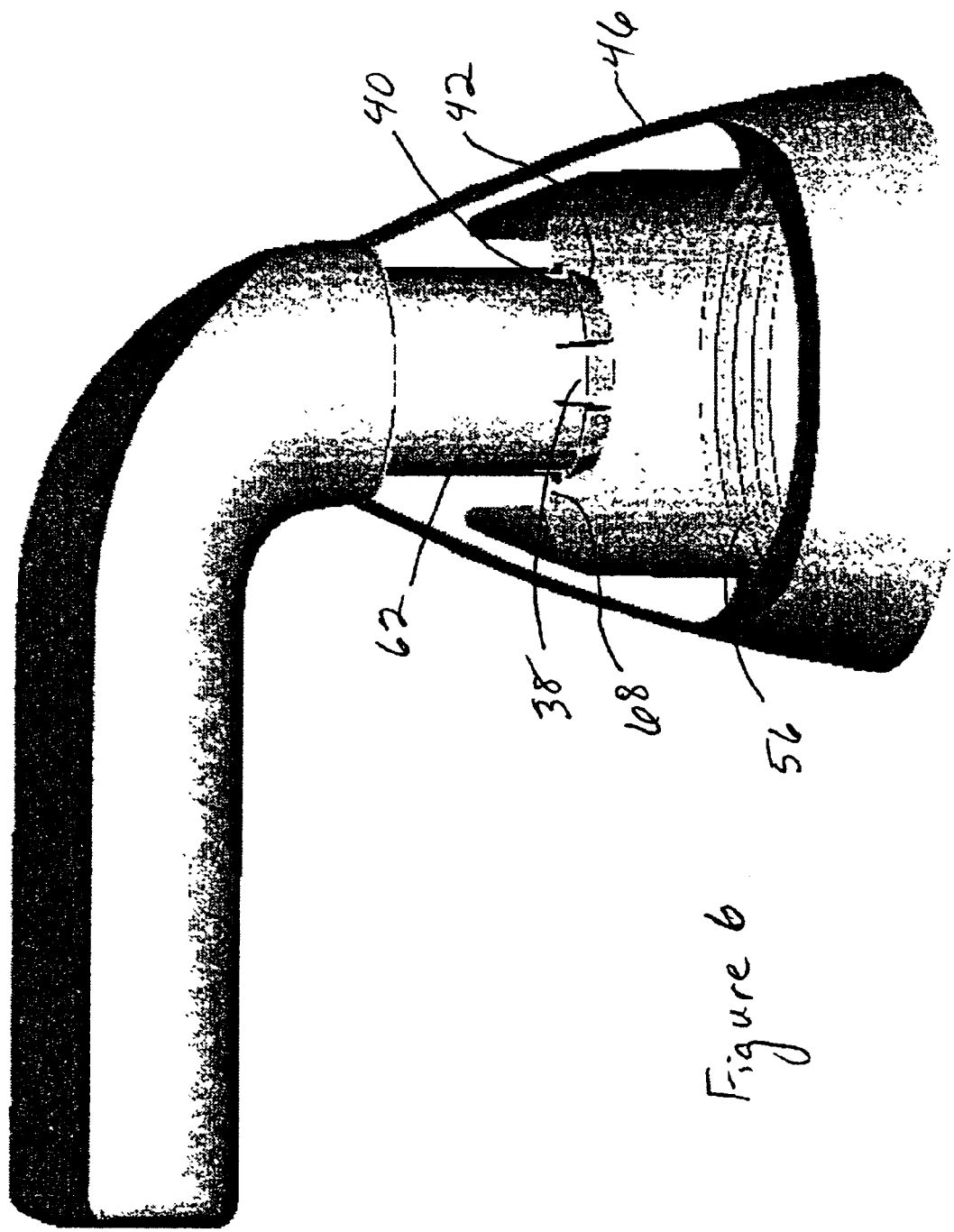
FIG. 6 is a perspective view of a hub and handle assembly with the hub being partially broken away.
Figure 7:
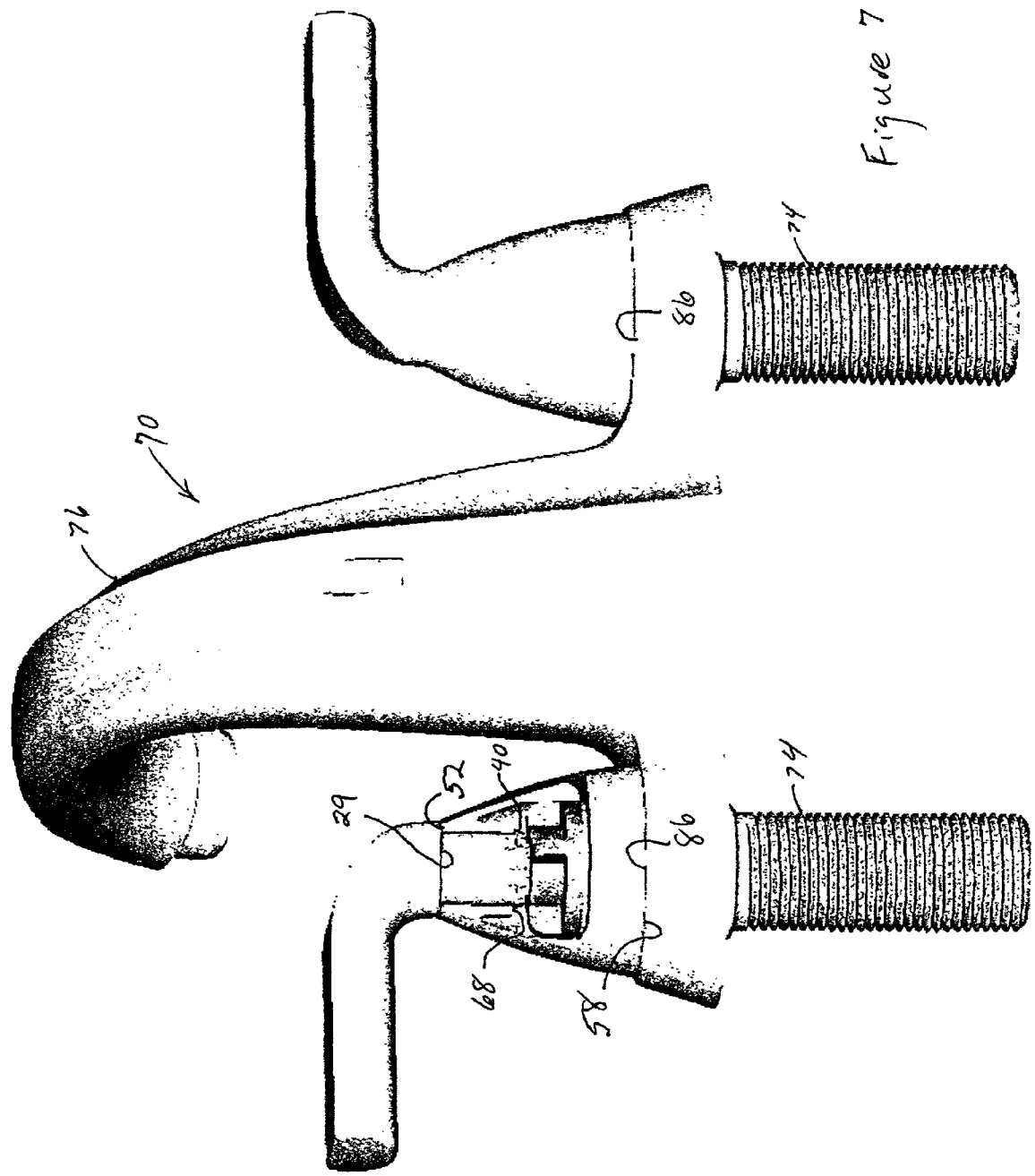
FIG. 7 is a rear perspective view of the faucet of FIG. 1 with the hub and handle assembly mounted on the faucet with the hub being partially broken away.

A two piece hub and handle assembly 10 according to the present invention is illustrated in FIGS. 1 and 6–7. The hub and handle assembly 10 includes a handle 12 and a hub 14 that engage a valve stem 16 and an end body 18, respectively. The handle 12 includes means 16 for rotatably engaging the hub 14 and the hub 14 includes means 18 for coupling the hub and handle assembly 10 to the end body 18.

The handle 12, illustrated in FIGS. 2–4 and 6, includes a grip portion 22 to be grasped by a user to rotate the valve stem 16 to control the amount of water flowing through the valve and a hub-engaging portion 28. Preferably, the handle 12 is molded from plastic material as a unitary piece and includes a first bearing surface 29. The hub-engaging portion 28 includes a tubular portion 30 having a first end 32 attached to the grip portion 22 and a second end 36. A plurality of flexible fingers 38 extend longitudinally from the second end 36. Each finger 38 includes a hub-engaging lug 40 that has a beveled surface 42. The tubular portion 30 further includes a plurality of internal longitudinal splines 44.

The hub 14, illustrated in FIGS. 5–6, includes a hollow frusto-conical body 46 having a top 50 with a second bearing surface 52 and a base 56 with a third bearing surface 58. A tubular handle-receiving portion 60 extends downwardly from a second bearing surface 52 into the interior of the hub 14 and defines a handle-receiving opening 62. The third bearing surface 52 includes a central opening 54 in with internal threads 56 (FIG. 6). The distal end 66 of the tubular handle-receiving portion 60 includes a fourth bearing surface 68.

In use, the hub-engaging portion 28 of the handle 12 is inserted into the handle-receiving opening 62. As the hub-engaging portion 28 is inserted, the beveled surfaces 42 of the flexible fingers 38 engage the inner edge of the tubular handle-receiving portion 60, moving the fingers 38 radially inwardly. When the hub-engaging portion 28 is fully inserted into the tubular handle-receiving portion 60, the first bearing surface 29 abuts the second bearing surface 52 and the fingers 38 move radially outwardly to engage the lugs 40 with the fourth bearing surface 68. The abutment of the first and second bearing surfaces 29, 52, and the engagement of the hub-engaging lugs 40 with the fourth bearing surface 52 axially retain the handle 12 on the hub 14 while permitting full rotational movement of the handle 12 in the hub 14.

Preferably, the hub and handle assembly 10 is used with a faucet assembly 70 as illustrated in FIGS. 1 and 4. The faucet assembly 70 includes a pair of end bodies 18 that are fluidly coupled to a spout 76. Each end body 18 includes external threads 74 and a valve disposed therein. Each valve includes a valve stem 16 with longitudinal splines 82 (FIG. 1).

The hub and handle assembly 10 is installed on the faucet assembly 70 by aligning the handle splines 44 with the valve splines 82 and sliding the tubular portion 30 onto the valve stem 16. As the tubular portion 30 engages the valve stem 16, the internal threads 56 of the hub 14 engage the external threads 74 of the end body 18. When fully installed, the third bearing surface 58 on the bottom of the hub 14 engages the top surface 86 of the faucet assembly 70. It will be appreciated that the hub 14 can also engage the end body 18 with a bayonet fitting or the like instead of threads.

Advantageously, the flexible fingers 38 and the beveled surfaces 42 allow easy assembly of the hub and handle assembly 10 without the need for special hardware or extra fasteners or connectors, thereby reducing manufacturing, material and labor costs. Moreover, the hub 14 and handle 12 are easily molded using conventional techniques, thereby further reducing costs.

A presently preferred embodiment of a hub and handle assembly has been described. However, it will be understood that various modifications can be made within the scope of the invention as claimed below.

What is claimed is:

1. A two piece faucet hub and handle assembly comprising:
   a hub having a bearing surface and a threaded portion; and
   a unitary handle coupled to the hub and having a plurality of fingers for engaging the bearing surface for rotational movement of the handle relative to the hub,
   wherein the handle includes a first bearing surface and the hub includes a second bearing surface, the first bearing surface abutting the second bearing surface to limit axial movement of the handle relative to the hub, and
   wherein the handle includes a plurality of lugs and the hub includes a third bearing surface, the plurality of lugs engaging the third bearing surface to limit axial movement of the handle relative to the hub.

2. A two piece hub and handle assembly for use with a valve disposed in an end body, comprising:
   a hub having a central axis and a central axially extending aperture, a bearing surface, and integral means for engaging the end body;
   a unitary handle including means for engaging the valve and a plurality of integral resilient fingers for engaging the hub,
   wherein the fingers include a first surface for engaging the hub and a second surface for engaging the bearing surface.

3. The assembly of claim 2 wherein the first surface is configured to cam the fingers toward the central axis for passage through the central aperture during engagement with the hub.

4. The assembly of claim 2 wherein the bearing surface of the hub includes a first hub bearing surface surrounding a first end of the central aperture and a second hub bearing surface surrounding a second end of the central aperture, and the handle includes a first handle bearing surface, the first handle bearing surface being operatively disposed adjacent the first hub bearing surface and the second surface of the handle being operatively disposed adjacent the second hub bearing surface.

* * * * *